United States Patent [19]

Ishibai et al.

[11] 4,293,187

[45] Oct. 6, 1981

[54] BINOCULAR OPTICAL SYSTEM WITH AUTOMATIC FOCUSSING

[75] Inventors: Isao Ishibai, Machida; Kunimitsu Kobayashi, Higashimurayama, both of Japan

[73] Assignee: Hoya Corporation, Tokyo, Japan

[21] Appl. No.: 74,354

[22] Filed: Sep. 10, 1979

[30] Foreign Application Priority Data

Sep. 11, 1978 [JP] Japan .................. 53-111430

[51] Int. Cl.³ .................. G02B 7/11; G02B 23/04
[52] U.S. Cl. ........................... 350/36; 350/46; 250/201
[58] Field of Search .............. 350/46, 47, 36; 250/201; 354/25, 163–169

[56] References Cited

U.S. PATENT DOCUMENTS

| | | | |
|---|---|---|---|
| 2,677,998 | 5/1954 | Schwartz et al. | 354/25 |
| 3,336,851 | 8/1967 | Warshawsky | 354/25 |
| 3,721,827 | 3/1973 | Reinheimer | 350/46 |
| 3,798,449 | 3/1974 | Reinheimer et al. | 350/46 |
| 4,146,316 | 3/1979 | Osawa | 354/25 |

*Primary Examiner*—Jon W. Henry
*Attorney, Agent, or Firm*—Sughrue, Mion, Zinn, Macpeak and Seas

[57] ABSTRACT

Binoculars including an automatically focussed optical system in which portions of the two incoming light beams are diverted to an automatic focussing module by two mirrors, one of which is fixed and the other movable. The movable mirror is adjusted until two images on an image screen coincide with one another. The position of the movable mirror is sensed and utilized in a servo control system for positioning the ocular lenses at a focussed position. The distance to the object being viewed is displayed by providing an indicator attached to the ocular lens positioning mechanism.

16 Claims, 2 Drawing Figures

BINOCULAR OPTICAL SYSTEM WITH AUTOMATIC FOCUSSING

BACKGROUND OF THE INVENTION

The present invention relates to an optical system especially adapted for use in binoculars. More particularly, the invention relates to an automatic focussing system for use with binoculars.

In the conventional set of binoculars, the focus is adjusted by separate adjustment rings provided for the ocular lenses for both of the two halves of the binoculars. These include generally a screw-threaded portion which upon manual rotation permits the ocular lenses to be moved in and out thereby changing the focal position with respect to a corresponding pair of objective lenses. Such binoculars are, for example, described in the booklet "Encyclopedia of Binoculars" published by the Japan Light Machinery Information Center, New York, N.Y., and the booklet "Binoculars and All-Purpose Telescopes", Henry E. Paul, published by AMPHOTO, New York, N.Y.

Although the well-known focussing system of the prior art was capable of adequately functioning, it was nonetheless desired to provide a binocular optical system in which the focussing position could be changed much more readily than was possible with the prior art system. It is also desirable to provide an optical system for binoculars in which it is not necessary for the ocular lenses and their supporting structure to be rotated which was frequently a source of annoyance to the user of the binoculars.

Although unknown in the binocular art, automatic focussing systems have been in the camera art, particularly in the single lens reflex camera art. For example, an automatic focussing system has been in use with cameras produced by Honeywell Co. In that system, an automatic focussing module is provided in which two unfocussed incoming light beams are reflected from opposite side of a prism with the resulting two parallel beams separately focussed and shone upon an image viewing screen. The camera lens is adjusted until the two images coincide upon the viewing screen. If desired, an automatic electronic device can be added to this system for automatically detecting when the two images coincide. Although admittedly such modules have been in use for some time in the camera art, their use has hitherto been unknown in the binocular art where, as opposed to the single lens reflex camera art utilizing a single in-line lens system, two entirely separate light paths and lens systems must necessarily be employed and these two focussed separately but in cooperation with one another.

Besides the desire for providing an automatic focussing system, it was desirable to provided binoculars in which the magnification power could quickly be adjusted without having to separately readjust the focal distance of both lens systems.

Accordingly, it is an object of the present invention to provide a binocular system in which the focal length can be changed quickly without rotation of the lens eye pieces.

Moreover, it is an object of the invention to provide such a binocular system in which the focus can be automatically adjusted as the field of view of the binoculars is changed or as the object being viewed moves.

SUMMARY OF THE INVENTION

These, as well as other objects of the invention, are met by providing an optical system for binoculars in which a portion of the incoming light flux from both optical paths is removed from the main light flux paths and directed into an automatic focussing module. Within the module, the two unfocussed light fluxes extracted from the main paths are directed upon a common prism which reflect the two fluxes in parallel through separate objective lens systems. The two objective lens systems focus the two fluxes upon a viewing screen. The lenses are chosen and their positions determined such that, with regard to the image as viewed by the binoculars user, the image is in focus when the two images shone upon the image screen coincide with one another.

To this effect, in a preferred embodiment to extract the two light fluxes utilized in the focussing operation from the main light flux paths, two semi-transparent mirrors are provided. One of these is fixed while the other is rotatable. In one embodiment, the rotatable mirror can be adjusted by an external operator-controllable knob. In a second embodiment, means is provided for detecting when the two images on the image screen coincide and the output of this detecting means is utilized to operate means for rotatably bearing the position of the rotatable semi-transparent mirror. In either embodiment, the rotational position of the rotatable mirror is sensed and utilized to operate a servo positioning device which controls the focal length position of the eyepiece ocular lenses. The preferred means is a potentiometer operationally and rotatably coupled to the rotatable mirror, the output of which is coupled through an amplifier to the servo positioning device.

Still further in accordance with the objects of the invention, the magnifying power of the binoculars of the invention can be varied by varying the longitudinal position of an unfocussed optical system composed of pairs of positive and negative lenses disposed between the semi-transparent mirrors and the prism of the automatic focussing module.

Yet further in accordance with the present invention, a metering system can be provided simply by providing a scale upon the output of the servo positioner thereby giving the user a direct readout of the distance to the object being viewed.

DESCRIPTION OF THE PREFERRED EMBODIMENTS

Figure 1:
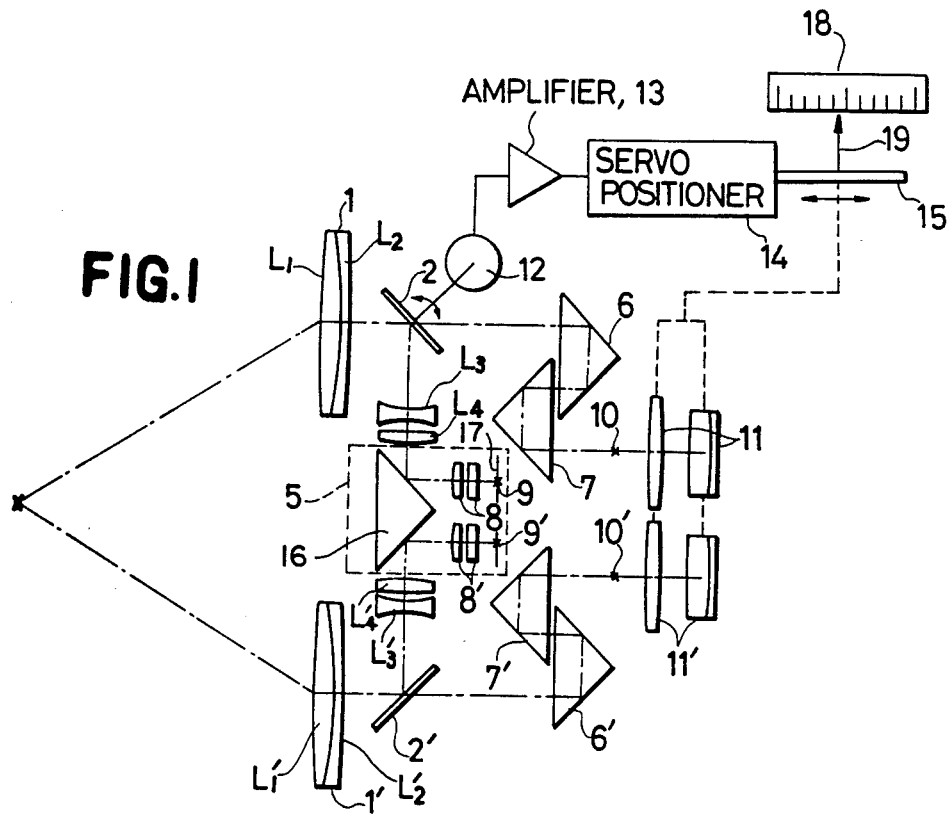
FIG. 1 shows a cross sectional view of a first embodiment of an automatic focussing binocular optical system in accordance with the teachings of the present invention.

Referring first to FIG. 1, there is shown therein as a cross-sectional plan view a first embodiment of a binocular optical system incorporating an automatic focussing system constructed in accordance with the teachings of the present invention. The incoming light flux from an object being viewed passes through a pair of objective lenses 1, 1' composed each of cemented lenses $L_1$, $L_2$ and $L_1'$, $L_2'$, respectively. After passing through pairs of objective lenses 1 and 1', the light fluxes strike a pair of semi-transparent reflecting mirrors 2, 2' of which mirror 2' is fixed in position and mirror 2 is rotatable about a center axis perpendicular to the plan of the drawing figure. The main flux path continues, as in a set of ordinary binoculars, through prism systems 6, 7 and 6', 7' to ocular viewing lenses 11 and 11'. The reflected components from mirrors 2 and 2', however, pass through unfocussed lens systems $L_3$, $L_4$ and $L_3'$, $L_4'$ after which they strike the reflecting surfaces of prism 16 with an automatic focussing module 5. The two light fluxes are reflected in parallel with one another from the opposite sides of prism 16 with the two parallel reflected beams passing through objective lenses 8 and 8'. Objective lenses 8 and 8' focus two images 9 and 9' upon image screen 17.

A potentiometer 12 is coupled to rotatable mirror 2 with the output of potentiometer 12 coupled to the input of amplifier 13 in such a manner that the output voltage of amplifier 13 is monotonically related to the angular position of rotatable mirror 2. The output of amplifier 13 is coupled to the control input of servo positioner 14. The output control element of servo positioner 14 is a control rod 15 which moves back and forth in response to the magnitude of the input control voltage. In turn, control rod 15 is operationally coupled to ocular lenses 11 and 11' to move them back and forth thereby changing their focal position with respect to objective lenses 1 and 1' so as to control the focus of the lens system.

In operation, the operator trains the binoculars on to the particular object that he wishes to view while watching the images on image screen 17. He then adjusts the knob attached to mirror 2 until images 9 and 9' coincide with one another upon screen 17. As mirror 2 is rotated, servo positioner 14 adjusts the position of ocular lenses 11 and 11' so that, with the proper choice of lenses as specified below, the image as viewed by the user will be focussed.

In an alternative embodiment, a module is provided which includes means for automatically detecting the distance between images 9 and 9'. From this module, an output signal is produced which varies in proportion to this distance. This output voltage is in turn coupled to a rotary positioner which rotates mirror 2 by an angular position in proportion to the output voltage. The mirrors are chosen and arranged such that the image as viewed by the user through ocular lenses 11 and 11' will be in focus when the output voltage from module 5 indicates that the two images 9 and 9' are in coincidence with one another.

The required relationships between the focal length of the various lenses are as follows. In the case that both negative and positive lens groups $L_3$, $L_3'$ and $L_4$, $L_4'$ are utilized, the following relationship must be maintained:

$0.2f_1 < |f_2| < 1.0f_1$, $0.7f_1 < |f_3| < 2.0f_1$.

In the case that only negative lens groups are utilized, the following relationship must be maintained:

$0.5f_1 < |f_2| < 2.0f_1$.

In both cases, $f_1$ is the focal length of the ocular lens, $-f_2$ is the focal length of the negative lens group $L_3$, $L_3'$ and $f_3$ is the focal length of the positive lens group $L_4$, $L_4'$.

Figure 2:
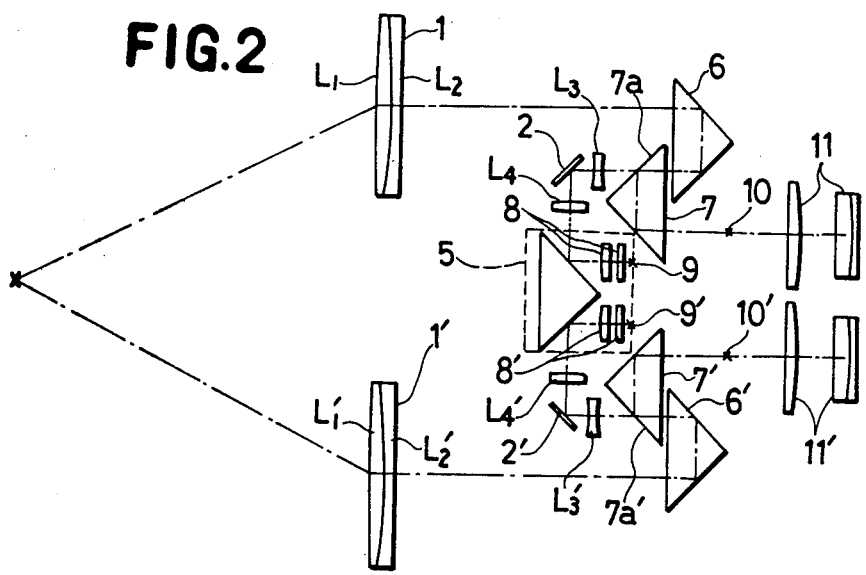
FIG. 2 is a second embodiment of the invention.

FIG. 2 shows a still further embodiment according to the present invention wherein like reference numerals designate like components in common with the embodiments of FIG. 1. In the embodiment of FIG. 2, prisms 7 and 7' include semi-transparent reflecting surfaces 7a and 7a', respectively, which pass a portion of the light flux passing therethrough outward in the direction of lenses $L_3$ and $L_3'$. Lenses $L_3$, $L_4$ and $L_3'$ and $L_4'$ form respective non-focussing lens system the same as in FIG. 1. Between lenses $L_3$ and $L_4$ is disposed a reflecting mirror 2 while a similar reflecting mirror 2' is disposed between lenses $L_3'$ and $L_4'$. As in the embodiment of FIG. 1, mirror 2' is fixed in position while mirror 2 is rotatable. It may readily be appreciated that the system of FIG. 2 otherwise functions identically to the embodiment shown in FIG. 1. In the embodiment of FIG. 2, potentiometer 12, amplifier 13, servo positioner 14 and the connections to ocular lenses 11, 11' have been omitted for clarity.

Still further in accordance with the invention, a visual indication of the distance to an object upon which the binocular system is focussed can be provided simply by adding a graduated scale 18 and a pointer 19 attached to control rod 15 of servo positioner 14. As servo positioner 14 moves control rod 15 in and out in accordance with the requisite focal length, pointer 19 moves back and forth along scale 18. Calibration may easily and straightforwardly be accomplished.

Yet further in accordance with the present invention, the magnification power of the binocular lens system can easily be varied simply by changing the longitudinal positions of non-focussing lenses $L_3$, $L_4$ and $L_s'$, $L_4'$ with respect to mirrors 2 and 2'. When the position of these lenses is varied, the distance between images 9 and 9' on screen 17 will vary accordingly and, in response to the change in position of the images, the control system will automatically reposition ocular lenses 11 and 11' to maintain the system in focus.

Yet further variations are possible. For example as shown in FIGS. 1 and 2, lenses $L_3$, $L_4$ and $L_3'$, $L_4'$ are constructed as sets of positive and negative lenses. However, it is possible to either omit positive lenses $L_4$ and $L_4'$ which can be replaced by a second set of negative lenses so as to maintain the unfocussed system.

In conclusion, as an actual example, a binocular system in accordance with the teachings of the present invention can be constructed having lenses with the following characteristics.

The curvature of radius of each lens is $r_1, r_2, \ldots, r_n$.
The central thickness of each lens is $d_1, d_2, \ldots, d_n$.
The refractive index of the optical material of each lens is $n_1, n_2, \ldots, n_k$.
The Abbe number of each lens is $\nu_1, \nu_2, \ldots, \nu_k$.

| Objective Lens Group | | | | |
|---|---|---|---|---|
| $L_1$ | $r_1 = 106.0$ | $d_1 = 9.2$ | $n_1 = 1.51680$ | $\nu_1 = 64.2$ |
| | $r_2 = -83.0$ | | | |
| $L_2$ | | $d_2 = 3.8$ | $n_2 = 1.62004$ | $\nu_2 = 36.3$ |
| | $r_3 = -404.0$ | | | |
| | | $d_3 = 34.0$ | | |

| Negative Lens Group | | | | |
|---|---|---|---|---|
| $L_3$ | $r_4 = -222.021$ | $d_4 = 2.81$ | $n_3 = 1.67003$ | $\nu_3 = 47.2$ |
| | $r_5 = 68.544$ | | | |
| | | $d_5 = 42.214$ | | |

| Positive Lens Group | | | | |
|---|---|---|---|---|
| $L_4$ { $r_6 = 164.844$ <br> $r_7 = -382.546$ | $d_6 = 5.411$ | $n_4 = 1.56384$ | $v_4 = 60.8$ | |

This concludes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. A binocular optical system for viewing an object, said system comprising:
   first and second optical paths for respectively providing first and second light fluxes of an object to be viewed by said binocular optical system;
   means for directing first portions of said first and second light fluxes through non-focused lenses to an image screen along first and second optical paths to produce first and second images, respectively;
   means for aligning said first and second images with one another on said image screen; and
   means for focussing third and fourth images to be viewed through said binocular optical system in response to said aligning means, said third and fourth images being formed by second portions of said first and second light fluxes, respectively.

2. The binocular optical system of claim 1 wherein said aligning means comprises manual adjustment means.

3. The binocular optical system of claim 1 wherein said aligning means comprises:
   means for producing an electrical signal representing a distance between said first and second images on said image screen; and
   means for mechanically positioning optical components in response to said electrical signal to align said first and second images with one another and to focus said third and fourth images viewed through said system.

4. The binocular optical system of any of claims 1, 2 and 3 wherein said aligning means comprises rotatable mirror means.

5. The binocular optical system of any of claims 1, 2 and 3 further comprising means coupled to said focussing means for producing a visual indication of a distance to an object viewed through said system.

6. A binocular optical system comprising:
   first and second objective lenses disposed respectively in first and second optical paths;
   first and second mirrors disposed respectively to reflect light from said first and second optical paths, said first mirror being fixed in position and said second mirror being movable;
   an image screen;
   reflecting means;
   first and second lens systems comprising non-focussing lenses for directing light fluxes reflected from said first and second mirrors to said reflecting means, said reflecting means directing light fluxes which have passed through said non-focussing lens systems toward said image screen;
   first and second focussing lenses disposed between said reflecting means and said image screen;
   first and second ocular lenses;
   first and second means for directing light respectively from said first and second optical paths to said ocular lenses;
   means for moving said movable mirror to align images from said first and second optical paths with one another upon said image screen; and
   means for moving said ocular lenses in response to said means for moving said movable mirror to focus images viewed through said system.

7. The binocular optical system of claim 6 wherein said means for moving said movable mirror comprises operator actuable means for manually varying the position of said mirror.

8. The binocular optical system of claim 6 wherein said means for moving said movable mirror comprises:
   means for producing an electrical signal representing a distance between images on said image screen; and
   means for rotating said movable mirror in response to said electrical signal.

9. The binocular system of claim 6 further comprising:
   first and second prisms for reflecting light from said first path to said first ocular lens; and
   third and fourth prisms for reflecting light from said second light path to said second ocular lens.

10. The binocular lens system of claim 9 wherein said first and second mirror comprise first and second semi-transparent mirrors disposed respectively in said first and second light paths between said first and second objective lens and said first and third prisms.

11. The binocular lens system of claim 9 wherein said second and fourth prisms each comprise a semi-transparent reflecting surface, said first and second mirrors being positioned to receive light transmitted through said reflecting surfaces.

12. The binocular lens system of any of claims 6 to 11 further comprising means coupled to and operating in response to said ocular lens moving means for producing a visual indication of a distance to an object viewed through said lens system.

13. The binocular lens system of any of claims 6 to 11 further comprising means for varying the position of at least one of said lens systems comprising said non-focussing lenses.

14. The binocular lens system of any of claims 6 to 11 wherein said lens systems comprising said non-focussing lenses each comprise a positive and negative lens pair.

15. The binocular lens system of any of claims 6 to 11 wherein said lens systems comprising said non-focussing lenses each comprise only a single negative lens.

16. The binocular lens system of any of claims 6 to 11 wherein said lens system comprising said non-focussing lenses each comprise a pair of negative lenses.

* * * * *